(12) United States Patent
Ohbayashi et al.

(10) Patent No.: US 6,845,210 B2
(45) Date of Patent: Jan. 18, 2005

(54) OPTICAL CONNECTOR WITH A SHUTTER

(75) Inventors: Yoshiaki Ohbayashi, Nara (JP); Keiji Mine, Yao (JP); Hiroshi Nakagawa, Kyoto (JP)

(73) Assignee: Hosiden Corporation, Yao (JP)

( * ) Notice: Subject to any disclaimer, the term of this patent is extended or adjusted under 35 U.S.C. 154(b) by 360 days.

(21) Appl. No.: 10/058,777

(22) Filed: Jan. 30, 2002

(65) Prior Publication Data
US 2002/0118931 A1 Aug. 29, 2002

(30) Foreign Application Priority Data

Feb. 23, 2001 (JP) ........................................ 2001-048178

(51) Int. Cl.⁷ ................................................ G02B 6/00
(52) U.S. Cl. ........................... 385/139; 385/70; 385/72; 385/78
(58) Field of Search .............................. 385/70, 72, 73, 385/75, 77, 78, 84, 88, 92, 94, 136, 139

(56) References Cited

U.S. PATENT DOCUMENTS

| 4,875,753 | A | * | 10/1989 | Kalomiris | 385/56 |
| 5,617,495 | A | * | 4/1997 | Funabashi et al. | 385/92 |
| 6,004,043 | A | * | 12/1999 | Abendschein et al. | 385/76 |
| 6,081,647 | A | * | 6/2000 | Roth et al. | 385/139 |
| 6,168,318 | B1 | * | 1/2001 | Soeda et al. | 385/78 |
| 6,226,437 | B1 | * | 5/2001 | Kikuchi et al. | 385/136 |
| 6,340,246 | B1 | * | 1/2002 | Yoshida et al. | 385/77 |
| 6,352,375 | B1 | * | 3/2002 | Shimoji et al. | 385/92 |
| 6,450,697 | B1 | * | 9/2002 | Ngo | 385/78 |
| 6,471,412 | B1 | * | 10/2002 | Belenkiy et al. | 385/73 |
| 6,481,902 | B2 | * | 11/2002 | Takaoka et al. | 385/92 |
| 6,595,696 | B1 | * | 7/2003 | Zellak | 385/72 |
| 6,652,152 | B2 | * | 11/2003 | Yang et al. | 385/139 |

FOREIGN PATENT DOCUMENTS

| JP | 57-158606 | 9/1982 |
| JP | 8-43681 | 2/1996 |

* cited by examiner

Primary Examiner—Michael P. Stafira
Assistant Examiner—Juan D Valentin, II
(74) Attorney, Agent, or Firm—Bacon & Thomas

(57) ABSTRACT

An optical connector with a shutter is provided which has functions of, when a plug (P) is not inserted, preventing dust from entering through an insertion and extraction port (12), and preventing light from leaking through the insertion and extraction port (12). In the invention, a shutter (5) is placed in an insertion space (13) of the body (1) in which an optical device (2) is disposed, and the shutter (5) is elastically urged in a closing direction. The shutter (5) is attached to a support shaft (4) which is placed in the vacant space (15) on a lateral side of the insertion and extraction port (12). When the plug (P) is not inserted, the shutter (5) closes the insertion and extraction port (12) to prevent ingress of dust and light leakage from occurring. The axial direction of the support shaft (4) coincides with the thickness direction of the body, whereby the height of the optical connector with a shutter can be reduced.

10 Claims, 8 Drawing Sheets

Fig. 6
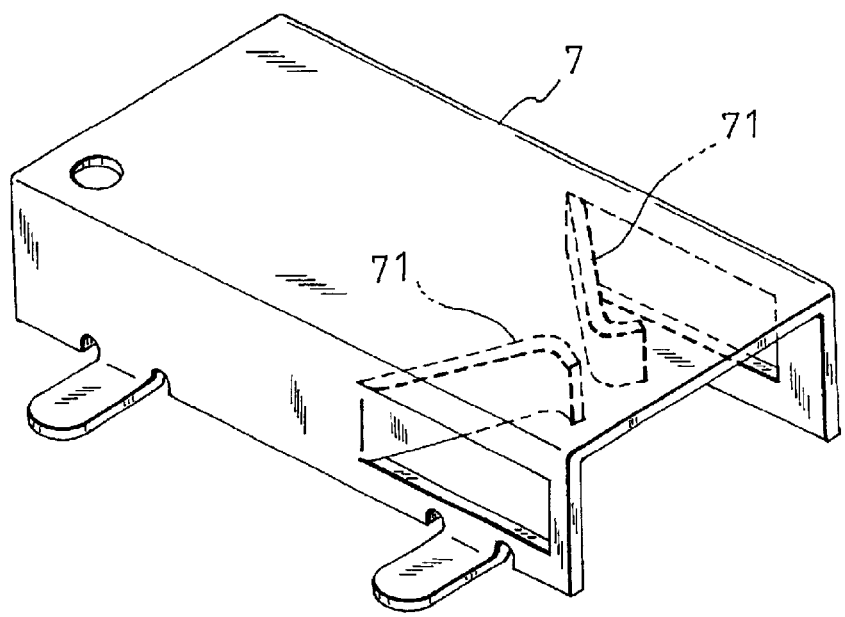
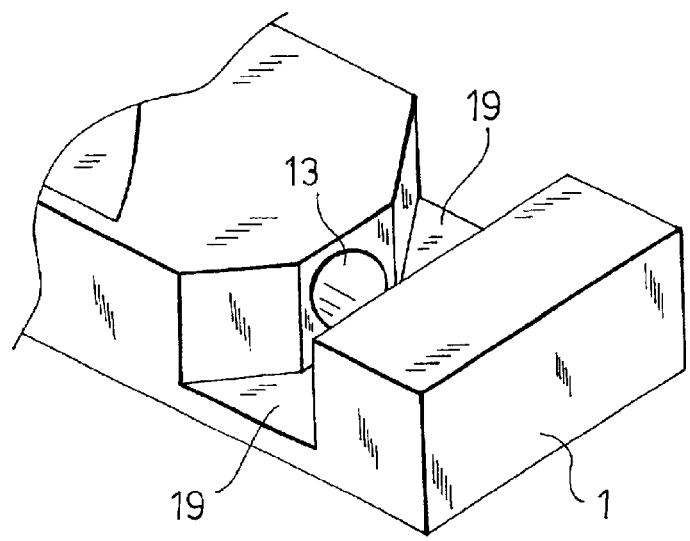

Fig. 7
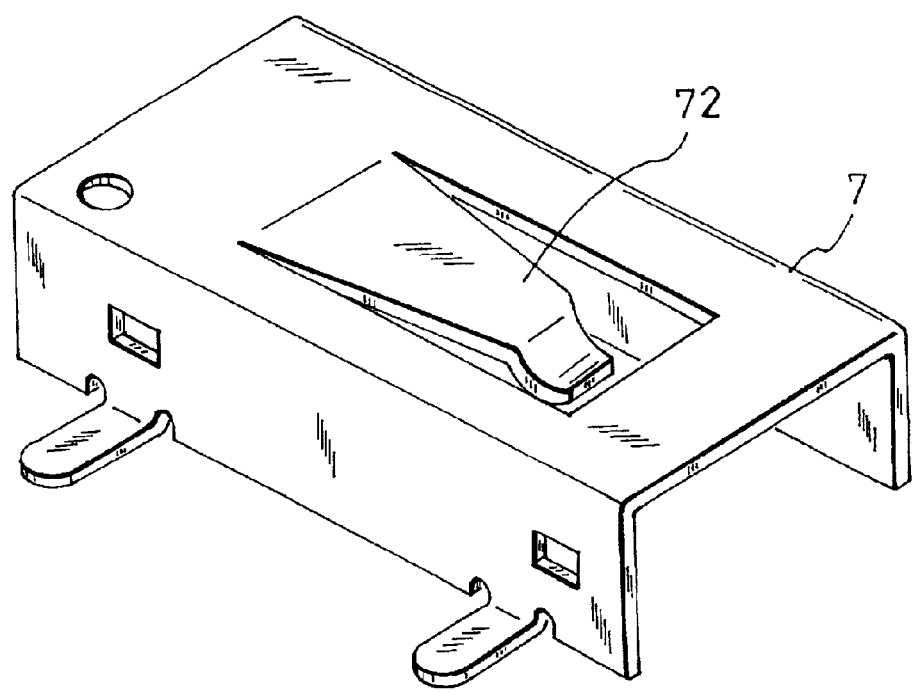
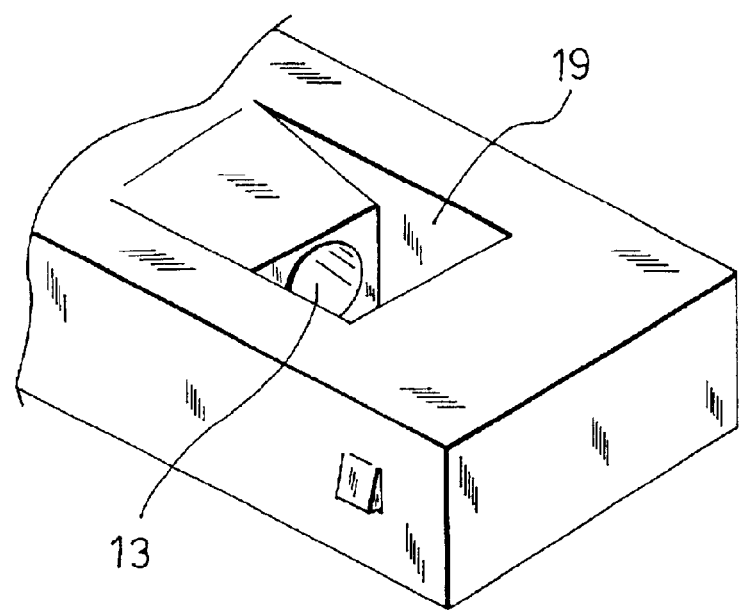

OPTICAL CONNECTOR WITH A SHUTTER

BACKGROUND OF THE INVENTION

1. Field of the Invention

The present invention relates to an optical connector with a shutter, and more particularly to an optical connector with a shutter which has functions of, when a plug serving as a counter optical connector is not inserted, preventing dust from entering through a plug insertion and extraction port, and preventing light from leaking through the insertion and extraction port, and in which a countermeasure for facilitating installation in a small apparatus case is taken.

2. Description of the Prior Art

Optical digital cables which are currently used include two types or rectangular ones and round ones. A rectangular optical connector is used for a rectangular optical digital cable, and a round optical connector for a round optical digital cable.

Among optical connectors which belong to rectangular optical connectors, some connectors are provided with a shutter for closing and opening an insertion and extraction port for a plug serving as a counter optical connector, so that, when the plug is not inserted, the shutter exerts functions of preventing ingress of dust and light leakage through the insertion and extraction port.

By contrast, conventional optical connectors which belong to round optical connectors are not provided with a shutter which exerts functions of prevent ingress of dust and light leakage through the insertion and extraction port. Such an optical connector has external dimensions which are smaller than those of the above-mentioned rectangular optical connector, and therefore is suitable for installation in a small apparatus case. In some of such round optical connectors, a rubber cap can be attached to or detached from the insertion and extraction port in order to prevent ingress of dust and light leakage through the insertion and extraction port when the plug is not inserted. Usually, a round optical connector has an electric contact. An installation space for the electric contact is ensured by a void space which is additionally formed into a shape that is obtained by laterally expanding the plug insertion space of the body.

The above-mentioned rectangular optical connector has large external dimensions irrespective of whether it comprises a shutter or not, and therefore is hardly installed in a small apparatus case. Since a shutter is not disposed, a round optical connector is low in function of preventing ingress of dust or light leakage through an insertion and extraction port when a plug is not inserted. In a round optical connector which uses a rubber cap in order to enhance the function, there arises a problem in that it requires much labors to attach and detach the rubber cap. Since provided with an electric contact, a round optical connector is more expensive than a rectangular optical connector.

SUMMARY OF THE INVENTION

The invention has been conducted in view of the above-discussed situation.

It is an object of the invention to provide an optical connector with a shutter in which a conventional round optical connector (round optical receptacle) is provided with a shutter having a function of closing and opening an insertion and extraction port, without impairing compactness of the round optical connector, particularly without increasing the height and lateral width, whereby ingress of dust and light leakage through the insertion and extraction port when a plug is not inserted can be prevented from occurring.

It is another object of the invention to enable the optical connector to be easily identified in kind such as a connector for transmission or that for reception, or the light transmission speed, whereby the optical connector is prevented from being erroneously used by the user.

The optical connector with a shutter of the invention includes: a body having an insertion and extraction port into and from which a plug serving as a counter optical connector is to be inserted and extracted, and an insertion space for the plug, the insertion space communicating with the insertion and extraction port; an optical device which is disposed in the body to be opposed to an end portion of the plug that is inserted into the insertion space; and a void space which is additionally formed in the plug insertion space to be expanded to a lateral side from the insertion and extraction port.

The above structure is identical with that employed in the conventional round optical connector which has been described in the beginning of the specification. In the conventional round optical connector, the void space which is additionally formed in the plug insertion space to be expanded laterally from the insertion and extraction port is used as a space for attaching an electric contact.

In the invention, the optical connector further includes: a support shaft which is placed in the vacant space; and a shutter which is attached to the support shaft to be openingly and closingly movable about the support shaft between a closing position where the shutter closes the insertion and extraction port in a form crossing the insertion space, and an opening position where the shutter is retracted into the vacant space to open the insertion and extraction port, the shutter being always elastically urged toward the closing position.

In the optical connector with a shutter configured as described above, the vacant space is used as a space for attaching the shutter and also as that for retracting the shutter when the port is to be opened. According to this configuration, therefore, compactness (the height and the width) identical with that of the conventional round optical connector can be attained although ingress of dust and light leakage through the insertion and extraction port can be prevented from occurring.

In the invention, a plate spring which rides over an outer peripheral face of the plug that is inserted into the insertion space, to be in elastic contact with the plug is disposed in an intermediate portion in a longitudinal direction of the insertion space. The plate spring may be configured by a spring piece which is formed by cutting and raising a part of a cover. In this case, the spring piece may be formed by cutting and inwardly raising a side wall of the cover, by cutting and inwardly raising an upper wall of the cover into a cantilever-like shape, or by cutting and inwardly raising an upper wall of the cover into a shape of a valley-like doubly-supported beam, and a rib-like arcuate ridge elongating in a width direction may be disposed in a bottom of the valley. When the spring piece is formed by cutting and raising a part of the cover, it is not necessary to use a plate spring which is a separate part. Consequently, the number of parts can be reduced to suppress the production cost to a low level. The plate spring may have a function of serving as a grounding contact.

In the invention, preferably, an axial direction of the support shaft coincides with a thickness direction of the body. According to this configuration, the height and width of the vacant space which allow the opening and closing operations of the shutter can be suppressed to a minimum degree to optimally maintain compactness of the optical connector.

In the invention, in the insertion space and the vacant space, a portion including an opening and closing moving path of the shutter may be opened in an upper face of the body. According to this configuration, the height of the body can be reduced by a dimension corresponding to the thickness of the upper wall of the body, as compared with the case where the vacant space is surrounded by the upper wall of the body. Therefore, the height reduction of the optical connector is enhanced. A configuration in which, in the insertion space and the vacant space, an opening port that is opened in the upper face of the body is closed by a cover mounted on the body may be employed. In this configuration, while the above-mentioned compactness of the optical connector is optimally maintained, dust is prevented by the cover from entering through the opening port which is opened in the upper face of the body, so that the optical characteristics of the optical connector is not impaired by entering dust.

In the invention, preferably, the shutter is colored, and the coloration of the shutter is observable through the insertion and extraction port. According to this configuration, the shutter can be colored in a different manner according to the kind of the optical connector. Therefore, the kind of the optical connector can be easily judged simply by seeing the color of the shutter through the insertion and extraction port. Consequently, the optical connector can be easily identified in kind such as a connector for transmission or that for reception, or the light transmission speed, whereby the optical connector is prevented from being erroneously used by the user.

As described above, according to the invention, an optical connector can be provided with a shutter, so that ingress of dust and light leakage through an insertion and extraction port when a plug is not inserted can be prevented from occurring, without impairing compactness of a conventional round optical connector, particularly without increasing the height and lateral width. When the shutter is colored, moreover, the kind of the optical connector can be easily identified. This is useful for preventing the optical connector from being erroneously used by the user.

BRIEF DESCRIPTION OF THE DRAWINGS

FIG. 6 is an exploded perspective view showing main portions of an example in which a cover is provided with a friction spring;

FIG. 7 is an exploded perspective view showing main portions of another example in which a cover is provided with a friction spring.

DETAILED DESCRIPTION OF THE PREFERRED EMBODIMENT

Figure 1:
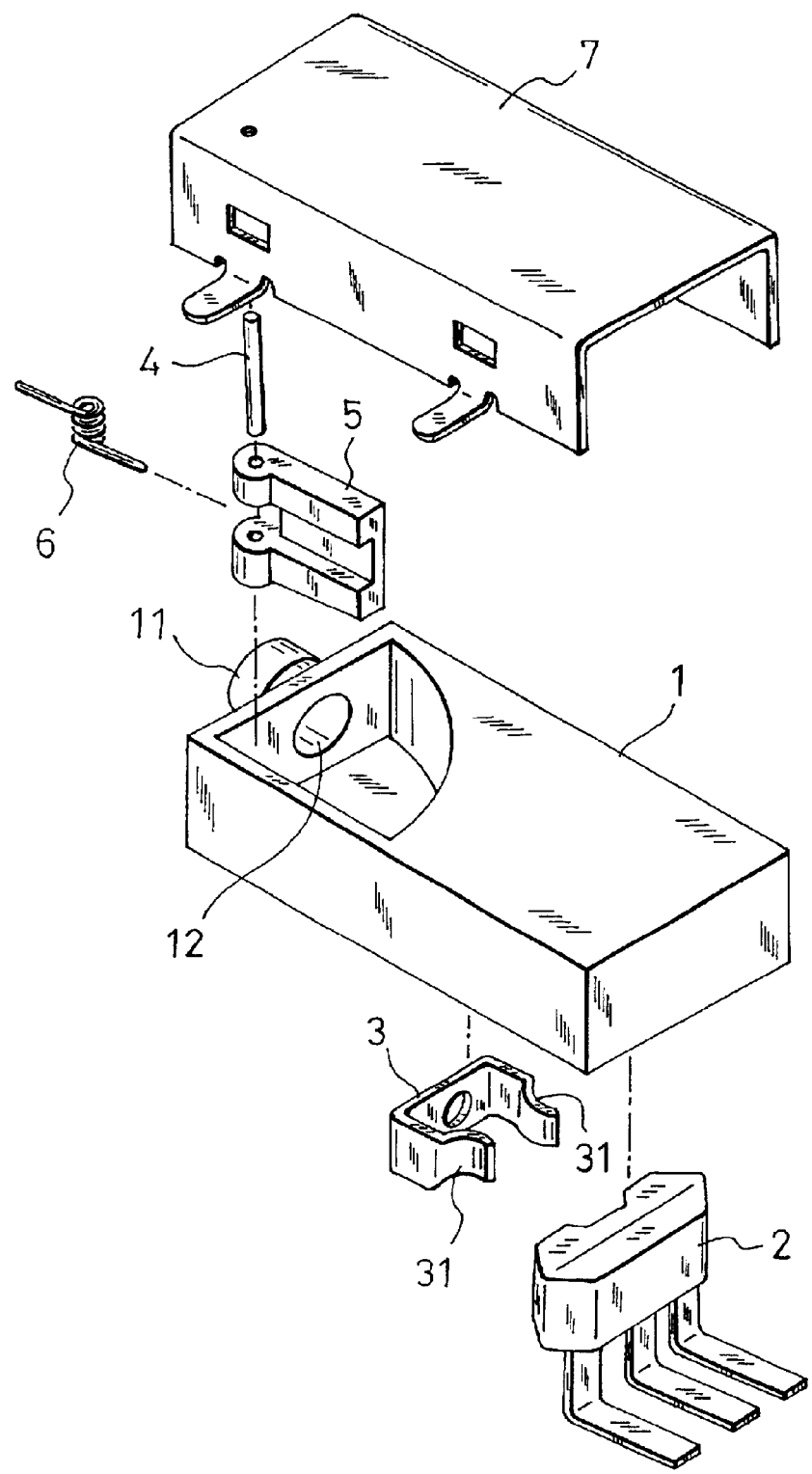
FIG. 1 is an exploded perspective view diagrammatically showing components of the optical connector with a shutter of the invention.

As shown in FIG. 1, an optical connector with a shutter has a flat body 1 in which a short cylindrical portion 11 is projected from the front end, and which is rectangular in plan, side, and front views. As seen from FIGS. 2, 3, and 4, in the body 1, the internal space of the cylindrical portion 11 is formed as an insertion and extraction port 12 into and from which a plug P serving as a counter optical connector is to be inserted and extracted. The diameter of the insertion and extraction port 12 is slightly larger than that of the outer periphery of the plug P. Therefore, the plug P can be easily inserted into the insertion and extraction port 12.

Figure 3:
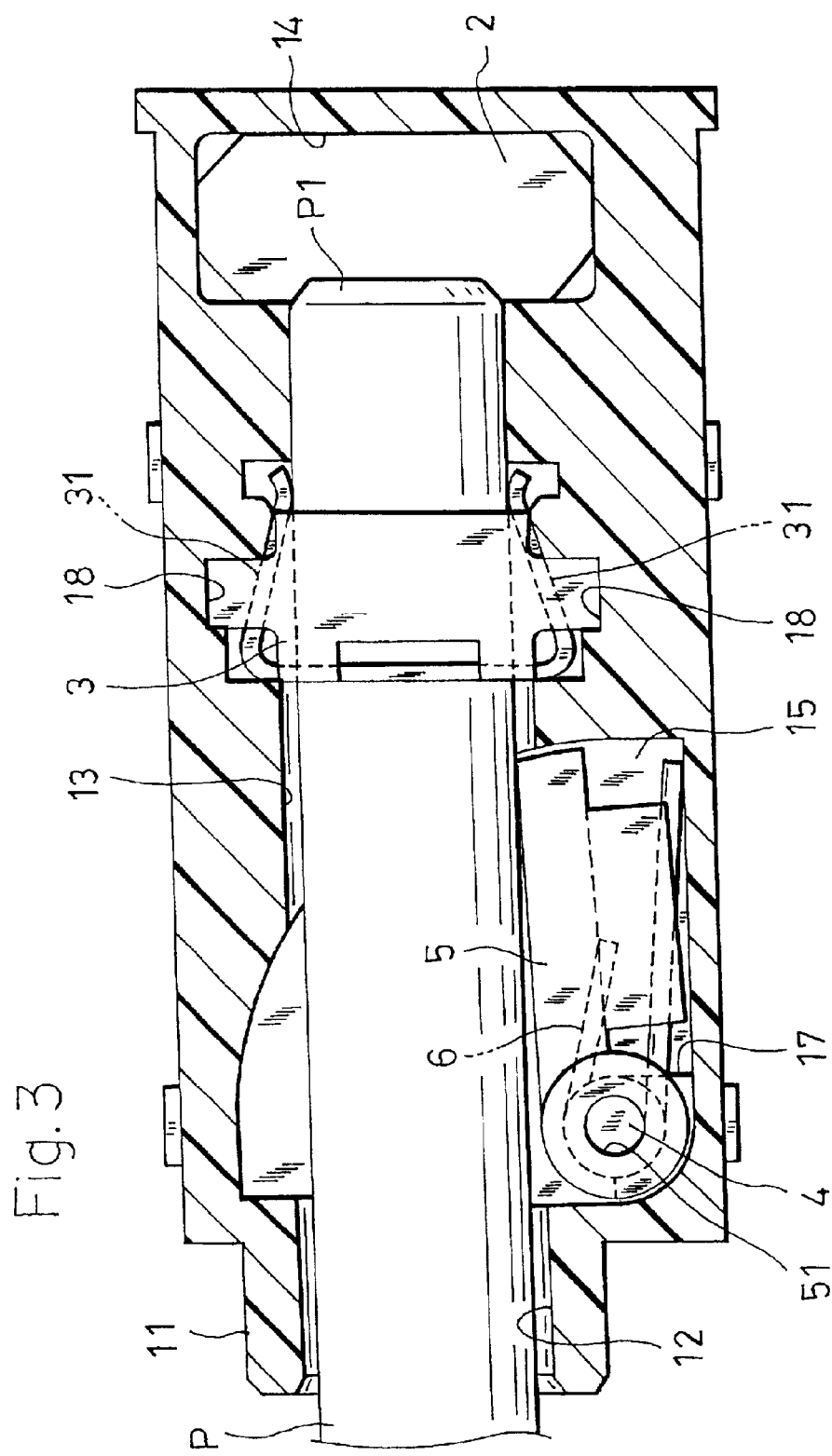
FIG. 3 is a cross sectional plan view of the optical connector in a state where the plug is inserted.
Figure 4:
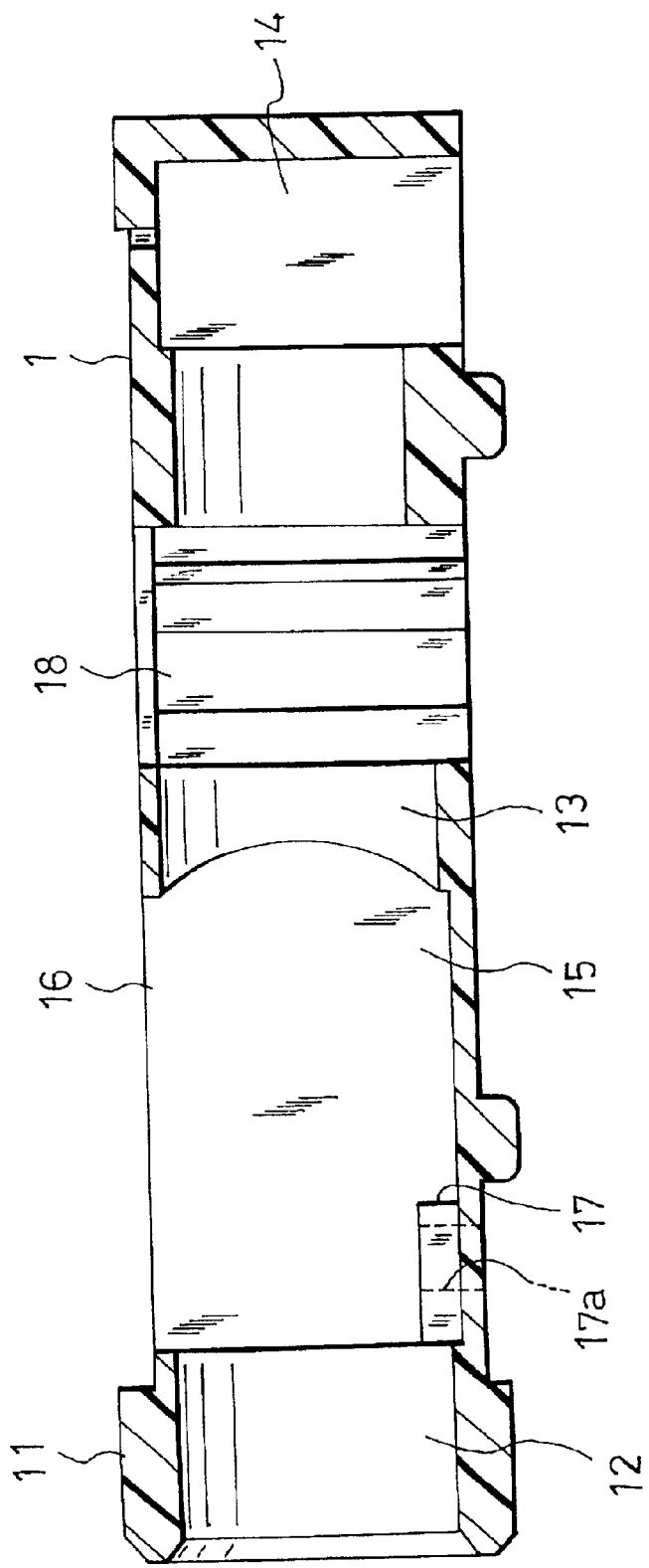
FIG. 4 is a longitudinal sectional side view of the body of the optical connector.

An insertion space 13 for the plug P which communicates with the insertion and extraction port 12 is straightly formed in the longitudinal direction in the body 1. An optical device installation space 14 is formed so as to face to a rear end portion of the space. An optical device 2 which is inserted from the lower side of the body 1 is disposed in the optical device installation space 14. As shown in FIG. 3, an end portion P1 of the plug P which is inserted into the insertion space 13 through the insertion and extraction port 12 is opposed to the optical device 2 so as to conduct photoelectric conversion. A recess 18 which is expanded on both the lateral sides of the insertion space 13 is disposed in an intermediate portion in the longitudinal direction (in the anteroposterior direction) of the insertion space 13. A plate spring 3 is attached by using the recess 18. The plate spring 3 has a pair of right and left elastic pieces 31. The elastic pieces 31 are in elastic contact with the outer peripheral face of the plug P which is inserted into the insertion space 13 and set to a predetermined position, from both the lateral sides, so as to exert functions of serving as positioning springs for suppressing rattling of the plug P, and as grounding contacts for removing away positive charges which are accumulated in the plug P.

A void space 15 is additionally formed in the insertion space 13 so as to be expanded to a lateral side from the insertion and extraction port 12. A portion which is formed by the insertion space 13 and the void space 15, and which has a sectoral shape in a plan view is opened in the upper face of the body 1, and the opened portion functions as an opening port 16.

A thick portion 17 is positioned in the void space 15. The lower end of a support shaft 4 which is a thin shaft is pressingly inserted into a hole 17a formed in the thick portion 17, so as to be attached thereto. Therefore, the axial direction of the support shaft 4 coincides with the thickness direction of the body 1.

The reference numeral 5 denotes a shutter. The support shaft 4 is inserted into a shaft hole 51 which is formed in a basal portion of the shutter, whereby the shutter is attached to the support shaft 4. In this attachment state, the shutter 5 is openingly and closingly movable about the support shaft 4 between a closing position (see FIG. 2) where the shutter closes the insertion and extraction port 12 in a form crossing the insertion space 13, and an opening position (see FIG. 3) where the shutter is retracted into the vacant space 15 to open the insertion and extraction port 12. A torsion spring 6 which is configured by a torsion coil spring is attached to the shutter 4. The shutter 5 is always elastically urged by the torsion spring 6 toward the closing position.

Figure 5:
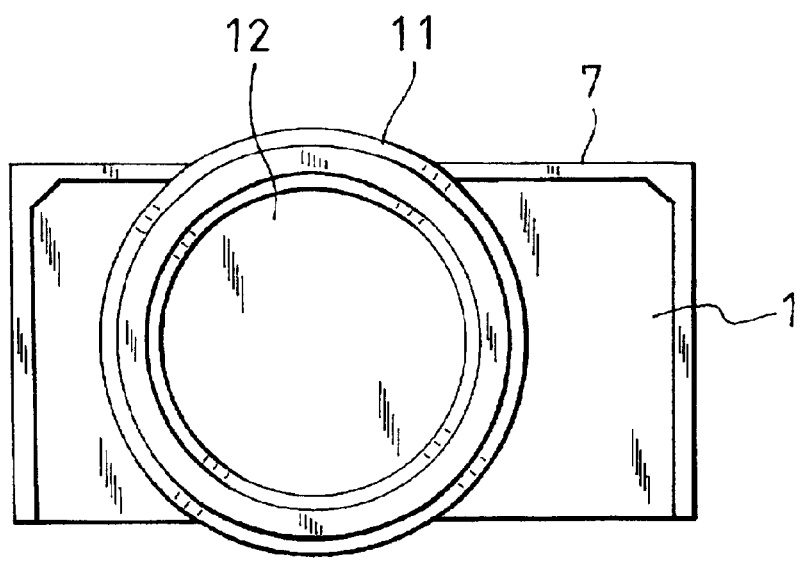
FIG. 5 is a front view of the optical connector.

As shown in FIG. 1 or 5, a cover 7 is mounted on the body 1 from the upper side, and the opening port 16 is closed by the cover 7.

Figure 2:
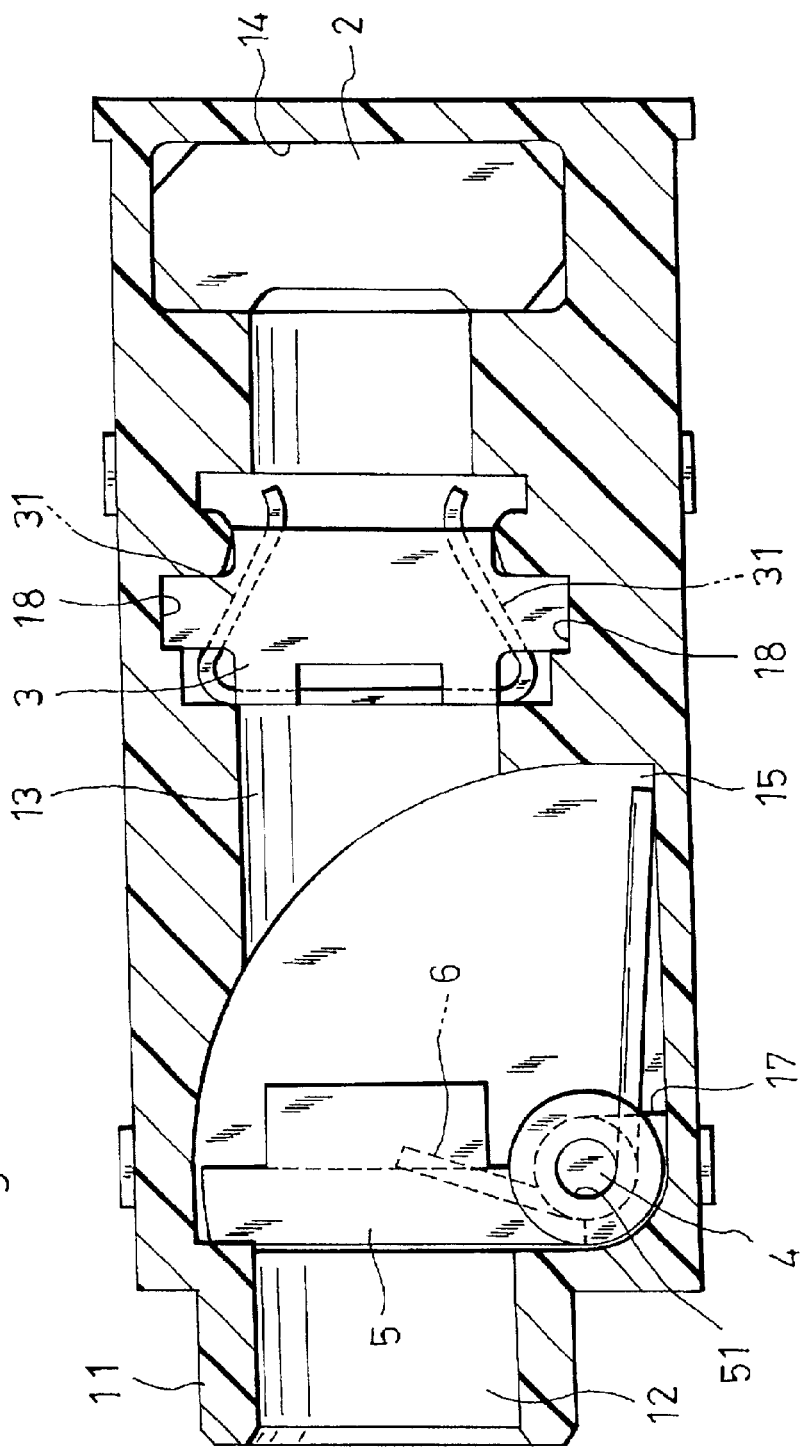
FIG. 2 is a cross sectional plan view of an optical connector of an embodiment of the invention, in a state where a plug is not inserted.

In the optical connector with a shutter configured as described above, in a state where the plug is not inserted, the shutter 5 which is elastically urged by the torsion spring 6 to be closingly moved to the closing position as shown in FIG. 2 completely closes the insertion and extraction port 12 from the inner side of the body 1. Therefore, dust does not enter the insertion space 13 through the insertion and extraction port 12, and light of the optical device 2 does not leak to the outside through the insertion and extraction port 12. When the plug P is inserted into the insertion space 13 through the insertion and extraction port 12, the shutter 5 is pushed by the plug P to be opened. In a state where the plug P is inserted into the insertion space 13 and set to a predetermined position, the shutter 5 is retracted into the vacant space 15 on the lateral side of the insertion space 13 as shown in FIG. 3.

In the embodiment, the friction spring 3 is formed as an independent part. Alternatively, the friction spring may be formed by a spring piece which is formed by cutting and raising a part of the cover 7.

FIG. 6 shows an example of such a configuration. In the example shown in the figure, a part of each of the right and left side walls of the cover 7 are cut and then inward raised to form a pair of right and left spring pieces 71, and the spring pieces 71 are placed in removal portions 19 which are formed on the right and left sides of the insertion space 13 of the body 1, respectively.

FIG. 7 shows another example. In the example shown in the figure, a part of the upper wall of the cover 7 is cut and then inward raised to form a cantilever-like spring piece 72, and the spring piece 72 is placed in a removal portion 19 which is formed above the insertion space 13 of the body 1.

Figure 8:
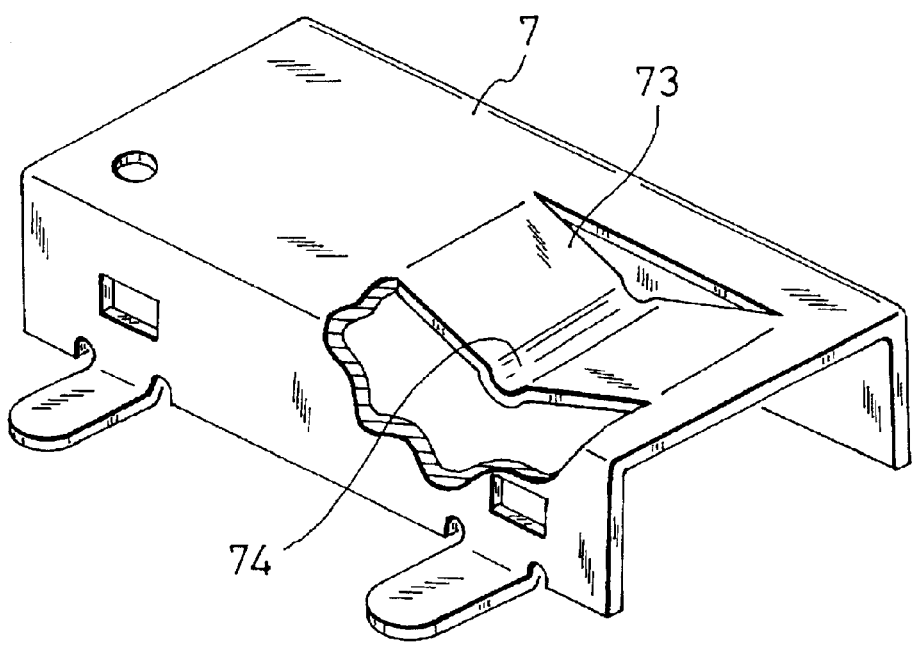
FIG. 8 is an exploded perspective view showing main portions of a further example in which a cover is provided with a friction spring.

FIG. 8 shows a further example. In the example shown in the figure, a part of the upper wall of the cover 7 is cut and then inward raised to form a doubly-supported beam-like spring piece 73 into a valley-like shape, and the spring piece 73 is placed in a removal portion 19 which is formed above the insertion space 13 of the body 1 in the same shape or structure as that shown in FIG. 7. In the spring piece 73 shown in FIG. 8, a rib-like arcuate ridge 74 which elongates in the width direction, and which is downward protruded is formed in the bottom of the valley. The rigidity in the width direction of the spring piece 73 is enhanced by the arcuate ridge 74, and elasticities of the portions which are on both the sides of the arcuate ridge 74 so as to sandwich the ridge are enhanced. Although the spring piece 73 is formed into a doubly-supported beam-like shape and has a high rigidity in the width direction, therefore, the portions which are on both the sides of the arcuate ridge 74 are high in elasticity. Consequently, the arcuate ridge 74 can be in elastic contact at a large force with the outer peripheral face of the plug P which is inserted into the insertion space 13 shown in FIG. 3 and the like and set to the predetermined position. According to this configuration, the spring piece 73 can be provided with excellent functions of serving as a positioning spring for suppressing rattling of the plug P, and as a grounding contact for removing away positive charges which are accumulated in the plug P.

In the optical connector of the embodiment which has been described with reference to FIGS. 1 to 4, the body 1 is structured in a manner which is basically identical with the body that is employed in the conventional round optical connector. In the conventional round optical connector, the void space is additionally formed in the plug insertion space to be expanded laterally from the insertion and extraction port, and used as a space for attaching an electric contact. By contrast, in the embodiment, the insertion space 13 and the void space 15 are configured so as to form a sectoral shape in a plan view, the shutter 5 is openingly and closingly moved in the sectoral portion, and the shutter 5 is attached to the body 1 by using the void space 15. Therefore, the width of the body 1 and hence that of the optical connector are within the same dimensional range as the width of the conventional round optical connector. Moreover, also the height of the body 1 and hence that of the optical connector are within the same dimensional range as the height of the conventional round optical connector. In the optical connector, consequently, the shutter 5 exerts functions of preventing ingress of dust and light leakage from occurring while compactness identical with that of the conventional round optical connector is maintained.

In the optical connector of the embodiment which has been described with reference to FIGS. 1 to 4, preferably, the shutter 5 is colored in an arbitrary color such as red or yellow. According to this configuration, the color of the shutter 5 can be seen from the outside through the insertion and extraction port 12. When the shutter 5 is colored in a different manner according to the kind of the optical connector, therefore, the kind of the optical connector can be easily judged simply by seeing the color of the shutter 5 through the insertion and extraction port 12. As a result, the optical connector can be easily identified in kind such as a connector for transmission or that for reception, or the light transmission speed, whereby the optical connector is prevented from being erroneously used by the user.

The entire disclosure of Japanese Patent Application No. 2001-048178 filed on Feb. 23, 2001 including specification, claims, drawings and summary are incorporated herein by reference in its entirety.

What is claimed is:

1. An optical connector with a shutter comprising:
   a body having an insertion and extraction port into and from which a plug serving as a counter optical connector is to be inserted and extracted, and an insertion space for said plug, said insertion space communicating with said insertion and extraction port;
   an optical device which is disposed in said body to be opposed to an end portion of said plug that is inserted into said insertion space;
   a void space which is additionally formed in said plug insertion space to be expanded to a lateral side from said insertion and extraction;
   a support shaft which is placed in said void space; and
   a shutter which is attached to said support shaft to be openingly and closingly movable about said support shaft between a closing position where said shutter closes said insertion and extraction port in a form crossing said insertion space, and an opening position where said shutter is retracted into said void space to open said insertion and extraction pod, said shutter being always elastically urged toward said closing position, wherein a plate spring which rides over an outer peripheral face of said plug that is inserted into said insertion space, to be in elastic contact with said plug is disposed in an intermediate portion in a longitudinal direction of said insertion space.

2. An optical connector with a shutter according to claim 1, wherein an axial direction of said support shaft coincides with a thickness direction of said body.

3. An optical connector with a shutter according to claim 1, wherein in said insertion space and said void space, a portion including an opening and closing moving path of said shutter is opened in an upper face of said body.

4. An optical connector with a shutter according to claim 3, wherein, in said insertion space and said void space, an opening port that is opened in said upper face of said body is closed by a cover mounted on said body.

5. An optical connector with a shutter according to claim 1, wherein said plate spring is configured by a spring piece which is formed by cutting and raising a part of a cover.

6. An optical connector with a shutter according to claim 5, wherein said spring piece is formed by cutting and inwardly raising a side wall of said cover.

7. An optical connector with a shutter according to claim 5, wherein said spring piece is formed by cutting and inwardly raising an upper wall of said cover into a cantilever-like shape.

8. An optical connector with a shutter according to claim 5, wherein said spring piece is formed by cutting and inwardly raising an upper wall of said cover into a shape of a valley-like doubly-supported beam, and a rib-like arcuate ridge elongating in a width direction is disposed in a bottom of the valley.

9. An optical connector with a shutter according to claim 1, wherein said shutter is colored, and the coloration of said shutter is observable through said insertion and extraction port.

10. An optical connector with a shutter according to claim 1, wherein said plate spring has a function of serving as a grounding contact.

\* \* \* \* \*

UNITED STATES PATENT AND TRADEMARK OFFICE
CERTIFICATE OF CORRECTION

PATENT NO.    : 6,845,210 B2
DATED         : January 18, 2005
INVENTOR(S)   : Y. Ohbayashi et al.

It is certified that error appears in the above-identified patent and that said Letters Patent is hereby corrected as shown below:

<u>Column 6,</u>
Line 52, "pod" should read -- port --.

Signed and Sealed this

Eleventh Day of April 2006

JON W. DUDAS
*Director of the United States Patent and Trademark Office*